United States Patent
Ono et al.

[11] Patent Number: 6,088,875
[45] Date of Patent: Jul. 18, 2000

[54] GROMMET

[75] Inventors: Mamoru Ono; Yoshinobu Seki, both of Shizuoka-ken, Japan

[73] Assignee: Yazaki Corporation, Tokyo, Japan

[21] Appl. No.: 09/040,928

[22] Filed: Mar. 19, 1998

[30] Foreign Application Priority Data

Mar. 21, 1997 [JP] Japan ..................... 9-068472

[51] Int. Cl.$^7$ .............. F16L 5/02; H01B 17/26; H01B 17/58
[52] U.S. Cl. ........................ 16/2.2; 174/153 G
[58] Field of Search ............... 16/2.2, 2.1; 174/153 G, 174/152 G, 65 G

[56] References Cited

U.S. PATENT DOCUMENTS

| Re. 24,438 | 2/1958 | Moorhead | 174/153 G |
|---|---|---|---|
| 2,690,470 | 9/1954 | Moorhead | 174/153 G |
| 5,499,823 | 3/1996 | Fukui | 174/153 G |
| 5,526,549 | 6/1996 | Mori et al. | 16/2.2 |
| 5,635,678 | 6/1997 | Yasukuni | 174/152 G |
| 5,774,934 | 7/1998 | Fujita et al. | 16/2.1 |

FOREIGN PATENT DOCUMENTS

| 63-2327 | 1/1988 | Japan . |
|---|---|---|
| 4-42982 | 4/1992 | Japan . |
| 8-294214 | 11/1996 | Japan . |

*Primary Examiner*—Chuck Y. Mah
*Attorney, Agent, or Firm*—Finnegan, Henderson, Farabow, Garrett & Dunner, L.L.P.

[57] ABSTRACT

A grommet is provided with an elastic grommet body, a mounting groove, a seal material and a cover portion. The grommet body has a first cylindrical portion disposed at one side, a second cylindrical portion disposed at the other end and a third cylindrical portion disposed within the first cylindrical portion. The first cylindrical portion has a maximum inner diameter larger than a maximum inner diameter of the second cylindrical portion. The third cylindrical portion projects to the one side from an inner peripheral surface of the first cylindrical portion. The inner peripheral surface of the second cylindrical portion and the inner peripheral surface of the third cylindrical portion defines a harness insertion portion in which a wire harness is inserted from one side to the other side. The inner peripheral surface of the first cylindrical portion and the outer peripheral surface of the third cylindrical portion defines an annular space for allowing the first cylindrical portion to elastically deform. The mounting groove is annually formed on the outer peripheral surface of the first cylindrical portion. The seal material is filled in the harness insertion portion in a state that the wire harness is inserted. The cover portion is disposed in an end portion of one side of the grommet body and closes the annular space without affecting an elastic deformation of the first cylindrical portion. The grommet can be easily mounted by the closed annular space, and a sound prevention performance can be improved.

8 Claims, 4 Drawing Sheets

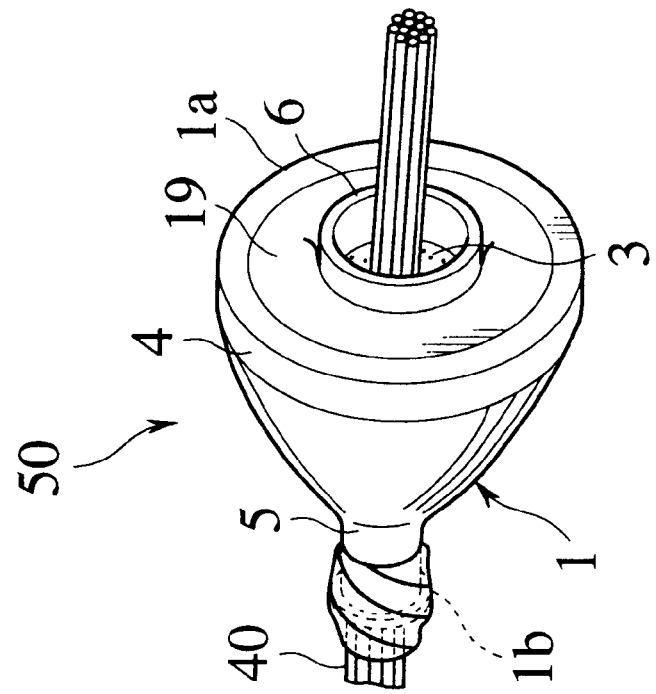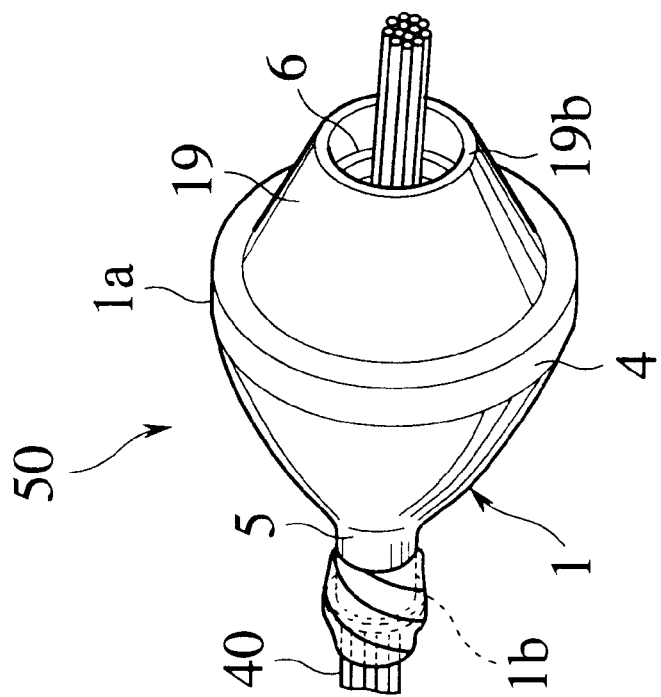

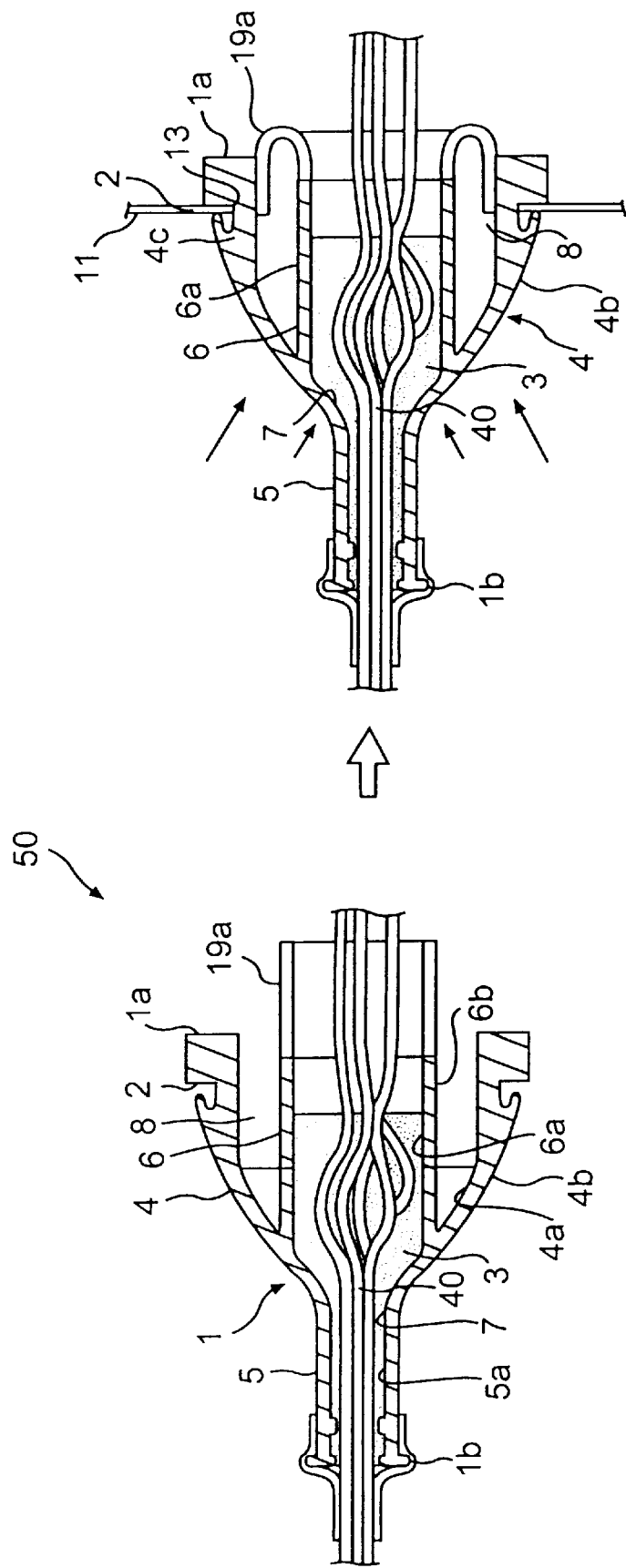

GROMMET

BACKGROUND OF THE INVENTION

The present invention relates to a grommet for a wire harness which performs a still water by filling a seal material therewithin.

FIG. 1 shows a conventional grommet disclosed in Japanese Utility Model Unexamined Publication No. 63-2327.

A grommet 30 is constituted by an elastic grommet body 31, a mounting groove 32 and a seal material 33. The grommet body 31 has a first cylindrical portion 34 disposed at one side 31a, a second cylindrical portion 35 disposed at the other side 31b and a third cylindrical portion 36 disposed within the first cylindrical portion 31.

The third cylindrical portion 36 projects to the one side 31a from an inner peripheral surface 34a of the first cylindrical portion 34. An inner peripheral surface 35a of the second cylindrical portion 35 and an inner peripheral surface 36a of the third cylindrical portion 36 defines a harness insertion portion 37 in which a wire harness 40 is inserted from the one side 31a to the other side 31b.

The mounting groove 32 is annually formed on an outer peripheral surface 34b of the first cylindrical portion 34.

The seal material 33 is filled in the harness insertion portion 37 in a state that the wire harness 40 is inserted.

The grommet 30 is mounted to a panel by elastically fitting the mounting groove 32 to a mounting hole of a panel in a vehicle body side.

However, in the grommet 30 mentioned above, since an annular space 38 for allowing the first cylindrical portion 34 to elastically deform is formed between the inner peripheral surface 34a of the first cylindrical portion 34 and the outer peripheral surface 36b of the third cylindrical portion 36, for example, in the case of mounting the grommet 30 to a dash panel or the like, a sound easily enters into a vehicle cabin from an engine room side through the first cylindrical portion 34 and the annular space 38

On the contrary, a structure for directly filling the seal material into the first cylindrical portion without providing the third cylindrical portion can be considered. However, in this case, an elastic deformation of the first cylindrical portion is restricted by a hardened seal material, so that it is hard to mount the mounting groove to the mounting hole of the panel.

SUMMARY OF THE INVENTION

An object of the present invention is to provide a grommet which can be easily mounted and has an excellent sound prevention performance.

In order to achieve the object mentioned above, in accordance with the present invention, there is provided a grommet comprising:

an elastic grommet body having a first cylindrical portion at one side, a second cylindrical portion at the other side and a third cylindrical portion within the first cylindrical portion, the first cylindrical portion having a maximum inner diameter larger than a maximum inner diameter of the second cylindrical portion, the third cylindrical portion projecting to the one side from an inner peripheral surface of the first cylindrical portion, an inner peripheral surface of the second cylindrical portion and an inner peripheral surface of the third cylindrical portion defining a harness insertion portion in which a wire harness is inserted from the one side to the other side, and the inner peripheral surface of the first cylindrical portion and an outer peripheral surface of the third cylindrical portion defining an annular space for allowing the first cylindrical portion to elastically deform;

a mounting groove annually formed on an outer peripheral surface of the first cylindrical portion;

a seal material filled in the harness insertion portion as the wire harness is inserted; and a cover portion disposed on an end portion in the one side of the grommet body, the cover portion closing the annular space without affecting an elastic deformation of the first cylindrical portion.

In the structure mentioned above, the grommet is mounted to the panel by elastically fitting the groove to the mounting hole of the panel in the vehicle body side.

A sound is transmitted through the annular space between two spaces separated by the panel. At this time, since an air layer within the annular space is shut in by the cover portion, the sound is transmitted after shut in the air layer once. Accordingly, a sound prevention performance can be significantly improved.

Since the first cylindrical portion can be easily deformed in an elastic manner by the annular space, the grommet can be easily mounted to the panel.

After mounted, a still water function can be secured by the seal material filled in the harness insertion portion.

BRIEF DESCRIPTION OF THE DRAWINGS

FIG. 2A is a perspective view of a grommet in accordance with an embodiment of the present invention before a cover portion is inverted;

FIG. 2B is a perspective view of the grommet shown in FIG. 2A is inverted;

FIGS. 4A and 4B show cross sectional views of an alternate embodiment of the invention.

DESCRIPTION OF THE PREFERRED EMBODIMENTS

An embodiment in accordance with the present invention will be described below with reference to the attached drawings.

Figure 1:
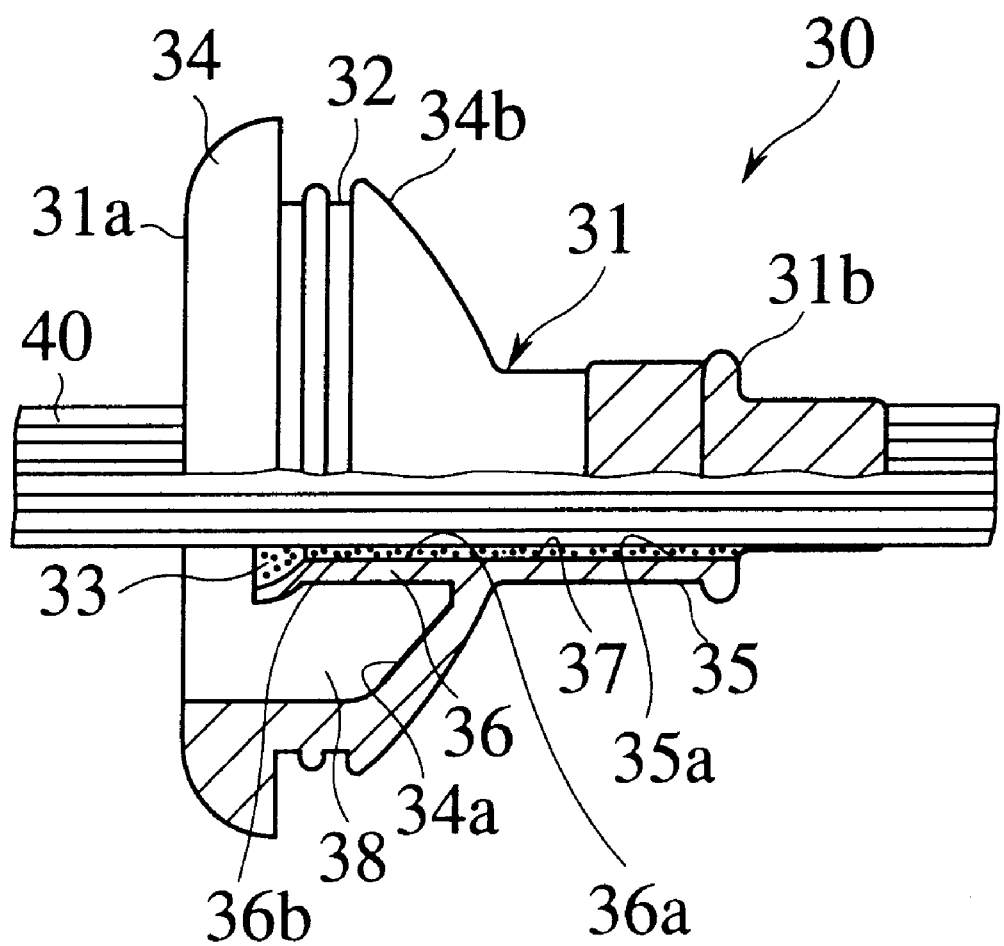
FIG. 1 is a partial cross sectional view of a conventional grommet.
Figure 3A:
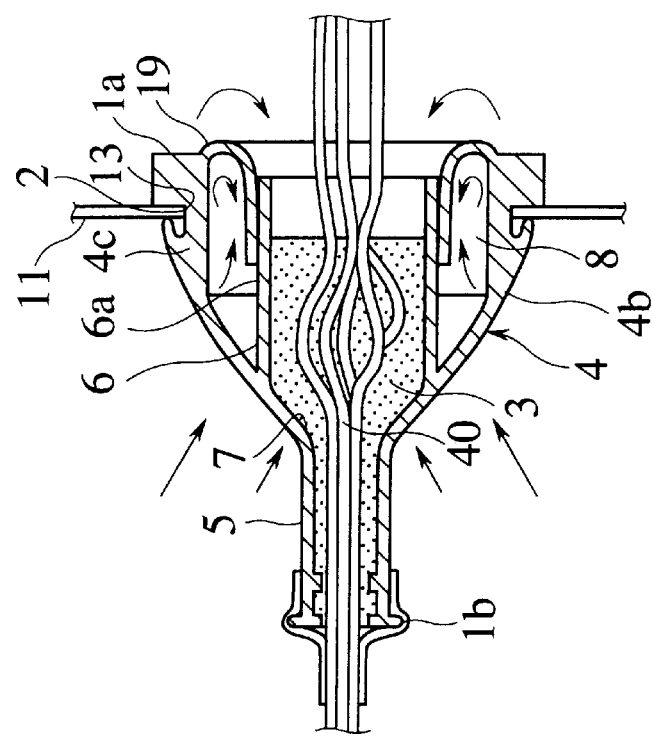
FIG. 3A is a cross sectional view of FIG. 2A.
Figure 3B:
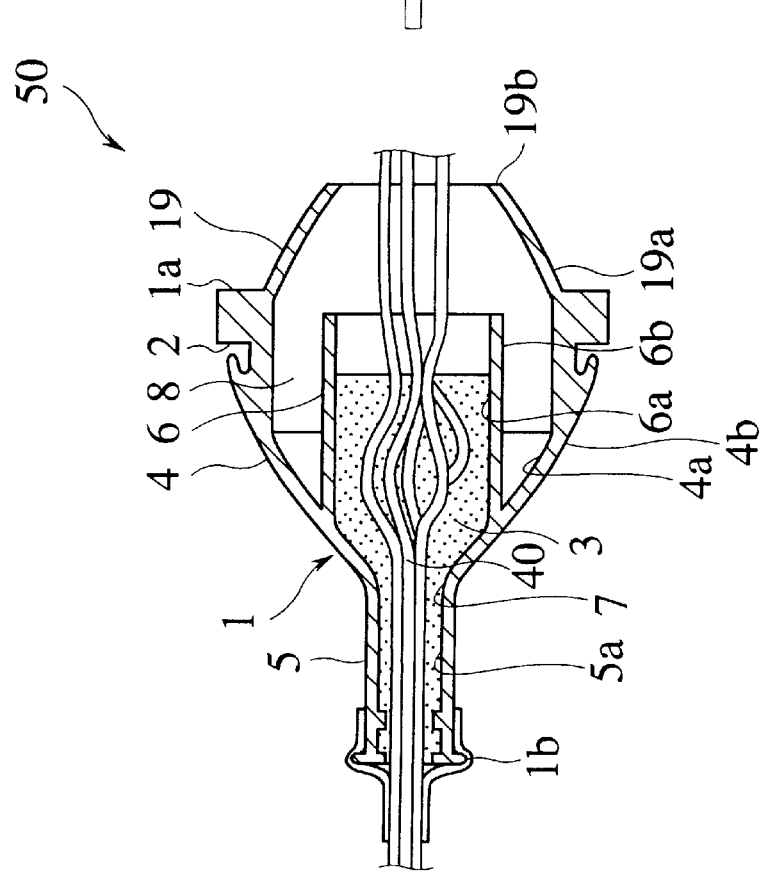
FIG. 3B is a cross sectional view of FIG. 2B.

FIGS. 2 and 3 show a grommet in accordance with embodiment of the invention. FIG. 2A is a perspective view of a grommet before a cover portion is inverted, FIG. 2B is a perspective view of the grommet after the cover portion is inverted, FIG. 3A is a cross sectional view before the cover portion is inverted and FIG. 3B is a cross sectional view after the cover portion is inverted.

As shown in FIGS. 2A, 2B, 3A and 3B, a grommet 50 is constituted by an elastic grommet body 1, a mounting groove 2, a seal material 3 and a cover portion 19.

The grommet body 1 has a first cylindrical portion 4 disposed at one side 1a, a second cylindrical portion 5 disposed at the other side 1b and a third cylindrical portion 6 disposed within the first cylindrical portion 4. An inner diameter of the first cylindrical portion 4 is expanded toward the one side 1a and is formed larger than a maximum inner diameter of the second cylindrical portion 5. An end portion 4c in the one side 1a of the first cylindrical portion 4 has a maximum inner diameter.

The third cylindrical portion 6 projects from an inner peripheral surface 4a of the first cylindrical portion 4 to the one side 1a. An inner peripheral surface 5a of the second cylindrical portion 5 and an inner peripheral surface 6a of the third cylindrical portion 6 define a harness insertion portion 7 in which a wire harness 40 is inserted from the one side 1a to the other side 1b. An annular space 8 for allowing the first cylindrical portion 4 to elastically deform is formed between the inner peripheral surface 4a of the first cylindrical portion 4 and an outer peripheral surface 6b of the third cylindrical portion 6.

The mounting groove 2 is annulary formed on an outer peripheral surface 4b of the end portion 4c of the first cylindrical portion 4.

The seal material 3 is permeable, waterproof, and filled into a harness insertion portion 7 after the wire harness 40 is inserted. The seal material 30 is filled in a gap between the wire harness 50 and the inner peripheral surfaces 5a and 6a and a gap between electric wires constituting the wire harness 50. Accordingly, waterproofing can be securely obtained.

The grommet 50 can be mounted to the panel 11 by elastically deforming the first cylindrical portion 4 and elastically fitting the mounting groove 2 to a mounting hole 13 of the panel 11 in the vehicle body side (refer to FIG. 3B).

The first cylindrical portion 4, the second cylindrical portion 5, the third cylindrical portion 6 and the cover portion 19 are integrally formed by an elastic material such as a synthetic resin and the like.

As shown in FIG. 2A, the cover portion 19 cylindrically extends toward the outer side of the grommet body 1 from the end portion 4c of the first cylindrical portion 4. A base end 19a of the cover portion 19 has an inner diameter substantially the same size as an inner diameter of the end portion 4a. A front end 19b of the cover portion 19 is tapered and has an inner diameter equal to or slightly smaller than an outer diameter of the third cylindrical portion 6. As shown in FIG. 3B, the cover portion 19 is inverted to an inner side and elastically deforms toward the annular space 8, thereby contacting the outer peripheral surface 6a of the third cylindrical portion 6. Accordingly, the cover portion 19 closes the annular space 8 without affecting an elastic deformation of the first cylindrical portion 4. In this case, a tape 21 is wound around the second cylindrical portion 5 and the wire harness 40.

Next, an operation of this embodiment will be described below.

The grommet 50 is mounted to the panel 11 by elastically fitting the mounting groove 2 to the mounting hole 13 of the panel 11 in the vehicle body side. The panel 11 is, for example, a dash panel disposed between an engine room and a vehicle cabin.

A sound at first enters into the annular space 8 between the two spaces separated by the panel 11. However, since an air layer within the annular space 8 is closed by the cover portion 19, the sound is transmitted after shut in the air layer. Accordingly, a sound leakage through the grommet 50 between the two spaces can be effectively restricted. For example, when the panel 11 is the dash panel, it is hard to leak the sound from the engine room to the vehicle cabin, so that a silent state within the vehicle cabin can be maintained.

Since the first cylindrical portion 4 is easily deformed by the annular space 8, the grommet 50 can be simply mounted to the panel 11.

After mounting the grommet 50, waterproofing can be secured by the seal material 3 filled in the harness insertion portion 7.

Since the cover portion 19 is integrally formed in the first cylindrical portion 4, even when the cover portion 19 is inverted, there is not generated a force of expanding the inner diameter of the third cylindrical portion 6. On the contrary, since the front end portion 19b of the cover portion 19 elastically presses the outer peripheral surface 6b of the third cylindrical portion 6, a force of reducing the inner diameter of the third cylindrical portion 6 is generated.

Accordingly, a close attachment state between the inner peripheral surface 6a of the third cylindrical portion 6 and the hardened seal material 3 can be maintained for a long time, thereby assuring that the waterproofing is also maintained for a long time.

In an alternative embodiment, the cover portion is not limited to a structure which is disposed in the first cylindrical portion 4. For example, FIGS. 4A and 4B show a cover portion 19a disposed in the third cylindrical portion 6. The cover portion 19a cylindrically extends from one side of the third cylindrical portion 6 and is capable of elastically deforming toward the annular space 8 so that the cover portion 19a contacts the inner peripheral surface 4a of the first cylindrical portion 4. Preferably, the cover portion 19a is integrally formed with the third cylindrical portion 6.

What is claimed is:

1. A grommet comprising:

an elastic grommet body having a first cylindrical portion at one side, a second cylindrical portion at the other side and a third cylindrical portion within the first cylindrical portion, the first cylindrical portion having a maximum inner diameter larger than a maximum inner diameter of the second cylindrical portion, the third cylindrical portion projecting to the one side from an inner peripheral surface of the first cylindrical portion, an inner peripheral surface of the second cylindrical portion and an inner peripheral surface of the third cylindrical portion defining a harness insertion portion in which a wire harness is inserted from the one side to the other side, and the inner peripheral surface of the first cylindrical portion and an outer peripheral surface of the third cylindrical portion defining an annular space for allowing the first cylindrical portion to elastically deform;

a mounting groove annually formed on an outer peripheral surface of the first cylindrical portion;

a seal material filled in the harness insertion portion as the wire harness is inserted; and a cover portion disposed on an end portion in the one side of the grommet body, the cover portion closing the annular space without affecting an elastic deformation of the first cylindrical portion.

2. A grommet as recited in claim 1, wherein the cover portion cylindrically extends from the one side of the first cylindrical portion, elastically deforms toward the annular space and is in contact with the outer peripheral surface of the third cylindrical portion.

3. A grommet as recited in claim 2, wherein the cover portion is integrally formed with the first cylindrical portion.

4. A grommet as recited in claim 2, wherein the cover portion extends outside the grommet body and is inwardly inverted.

5. A grommet as recited in claim 1, wherein the cover portion cylindrically extends from the one side of the third cylindrical portion, elastically deforms toward the annular space and is in contact with the inner peripheral surface of the first cylindrical portion.

6. A grommet as recited in claim 5, wherein the cover portion is integrally formed with the third cylindrical portion.

7. A grommet as recited in claim 5, wherein the cover portion extends outside the grommet body and is inwardly inverted.

8. A grommet as recited in claim 1, wherein the seal material has a permeability and a waterproof.

* * * * *